United States Patent
Clover

[15] 3,684,029
[45] Aug. 15, 1972

[54] DEPTH CONTROL SKID FOR LAND WORKING MACHINE

[72] Inventor: John R. Clover, 270 S. 3rd West, Lehi, Utah 84043

[22] Filed: Aug. 13, 1970

[21] Appl. No.: 63,521

[52] U.S. Cl. ............... 172/239, 172/72, 172/200, 172/387, 172/541, 172/729
[51] Int. Cl. ............................................. A01b 63/114
[58] Field of Search....... 172/72, 81, 63, 71, 177, 188, 172/197, 199, 200, 387, 394, 541, 665, 729, 738, 764

[56] References Cited

UNITED STATES PATENTS

| | | | |
|---|---|---|---|
| 2,910,129 | 10/1959 | Howard | 172/42 |
| 2,687,681 | 8/1954 | Phenice | 172/764 |
| 2,820,405 | 1/1958 | Puckett | 172/200 |
| 2,618,081 | 11/1952 | Sinner et al. | 172/200 |
| 2,739,517 | 3/1956 | Roberts | 172/72 |
| 2,673,434 | 3/1954 | Babinchak | 172/199 |
| 2,622,499 | 12/1952 | Fraga | 172/200 |
| 2,795,060 | 6/1957 | Geiszler | 172/199 |
| 2,868,306 | 1/1959 | Key | 172/200 |
| 3,145,489 | 8/1964 | Smith | 172/199 |
| 2,886,116 | 5/1959 | Howard | 172/497 |

FOREIGN PATENTS OR APPLICATIONS

| | | | |
|---|---|---|---|
| 856,630 | 12/1960 | Great Britain | 172/72 |
| 361,685 | 6/1962 | Switzerland | 172/72 |
| 139,809 | 3/1953 | Sweden | 172/72 |

*Primary Examiner*—Robert E. Pulfrey
*Assistant Examiner*—C. W. Hanor
*Attorney*—Clarence A. O'Brien and Harvey B. Jacobson

[57] ABSTRACT

A depth control skid for utilization on a soil working implement mounted on and operative from a tractor incorporating an automatic hydraulic draft control operative in response to the tensioning or compressing of the top link of a three point hitch. The skid pivotally mounts on the implement and trails therebehind. An adjustable chain fixes the skid relative to the implement so as to set the penetration depth, the skid trailing the implement so as to plane over the earth and effect a leveling thereof as well as a reaction to variations in the ground which are transmitted to the draft control for an adjustment of the implement.

2 Claims, 6 Drawing Figures

PATENTED AUG 15 1972

John R. Clover
INVENTOR.

BY Clarence A. O'Brien
and Harvey B. Jacobson
Attorneys

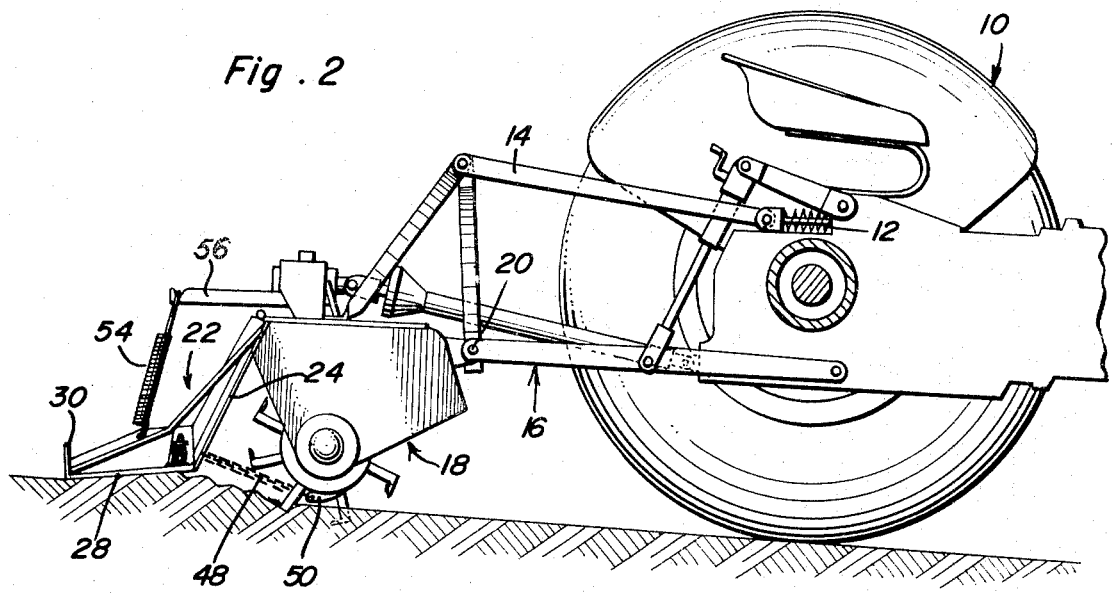
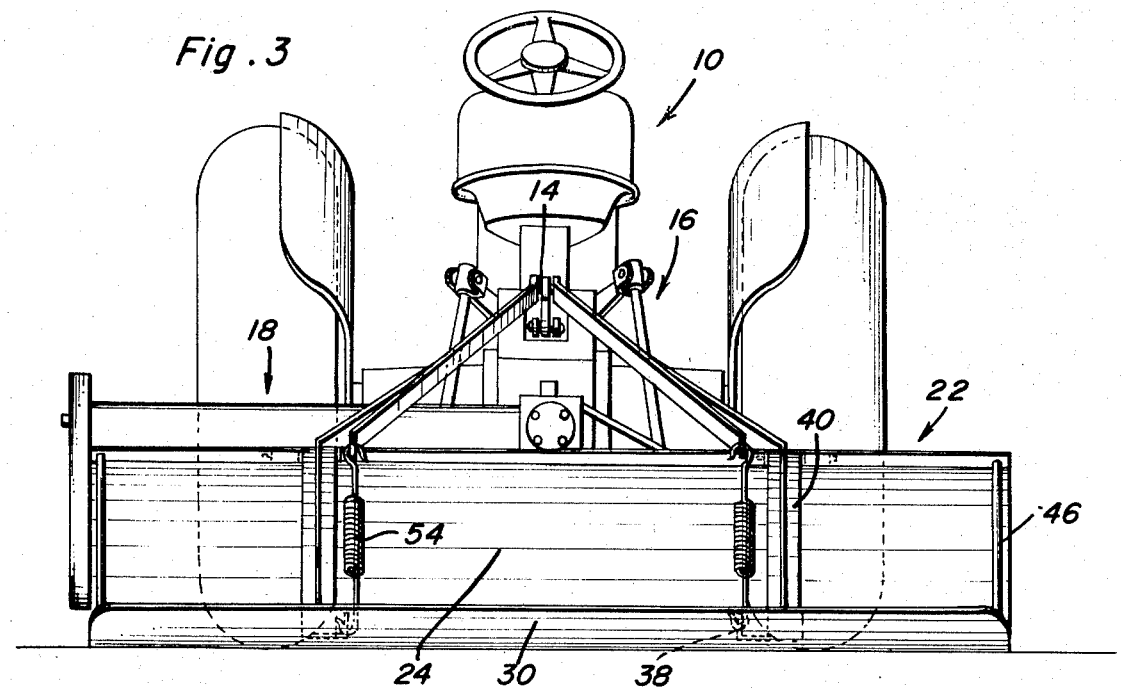

PATENTED AUG 15 1972

John R. Clover
INVENTOR.

BY Clarence A. O'Brien
and Harvey B. Jacobson
Attorneys

DEPTH CONTROL SKID FOR LAND WORKING MACHINE

The present invention is generally concerned with a depth control system for soil engaging implements, and more particularly relates to a skid control for a rotary tiller which operates through the conventional automatic draft control hydraulic system provided on modern tractors.

While depth controls for rotary tillers and the like are generally known, the apparatus heretofore utilized have incorporated various undesirable features including an inability to smooth out small variations in the soil, such as in a plowed field, and the necessity for modifying the mounting of the tiller itself on the tractor. Accordingly, it is a primary object of the instant invention to provide depth control means which, while relatively simple in construction and operation, constitutes a significant improvement over the means heretofore utilized.

In particular, the invention herein resides in the provision of a tailboard or trailing skid which pivotally mounts to the upper rear portion of the soil working implement and is maintained in a downwardly pivoted trailing position relative thereto by adjustable chain means which are in turn tensioned by appropriate spring means biasing the skid upward. The skid fixes the depth of penetration of the tiller teeth and, being in a trailing position, does not interfere with the action of the tiller in smoothing out small variations in the soil level. Larger variations of course cause a reactant movement of the skid which is transmitted through the tiller support linkage to the conventionally provided automatic draft control for an automatic readjustment of the tiller and trailing skid.

Advantages with regard to this particular arrangement include the fact that only standard linkage is used to mount the tiller, the skid itself being mounted solely on the tiller in trailing relation thereto. Further, the conventionally provided tractor controls can be utilized in effecting a precise control of the weight of the tiller assumed by the ground, even during operation. The depth of the tilling operation can be easily preset through the adjustable chains which vary the relationship between the skid and the tiller. In addition, the trailing position of the skid provides a leveling action tending to fill and level the earth rearward of the tiller, the weight on the skid being easily controlled through the conventional hydraulic support system for the tiller, thereby achieving the desired recompaction of the soil. The invention herein is also significant in that it allows for a complete flexibility between the tractor and tiller without changing the skid-to-tilled-earth weight. Further, by enabling the maintenance of a constant depth and loading condition, it is contemplated that a substantial saving in fuel and maintenance will result which, in addition to the basic simplicity of the structure itself, results in a highly economical unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a side elevational view of the construction of FIG. 1 with the near wheel of the tractor removed;

FIG. 3 is a rear elevational view;

Figure 1:
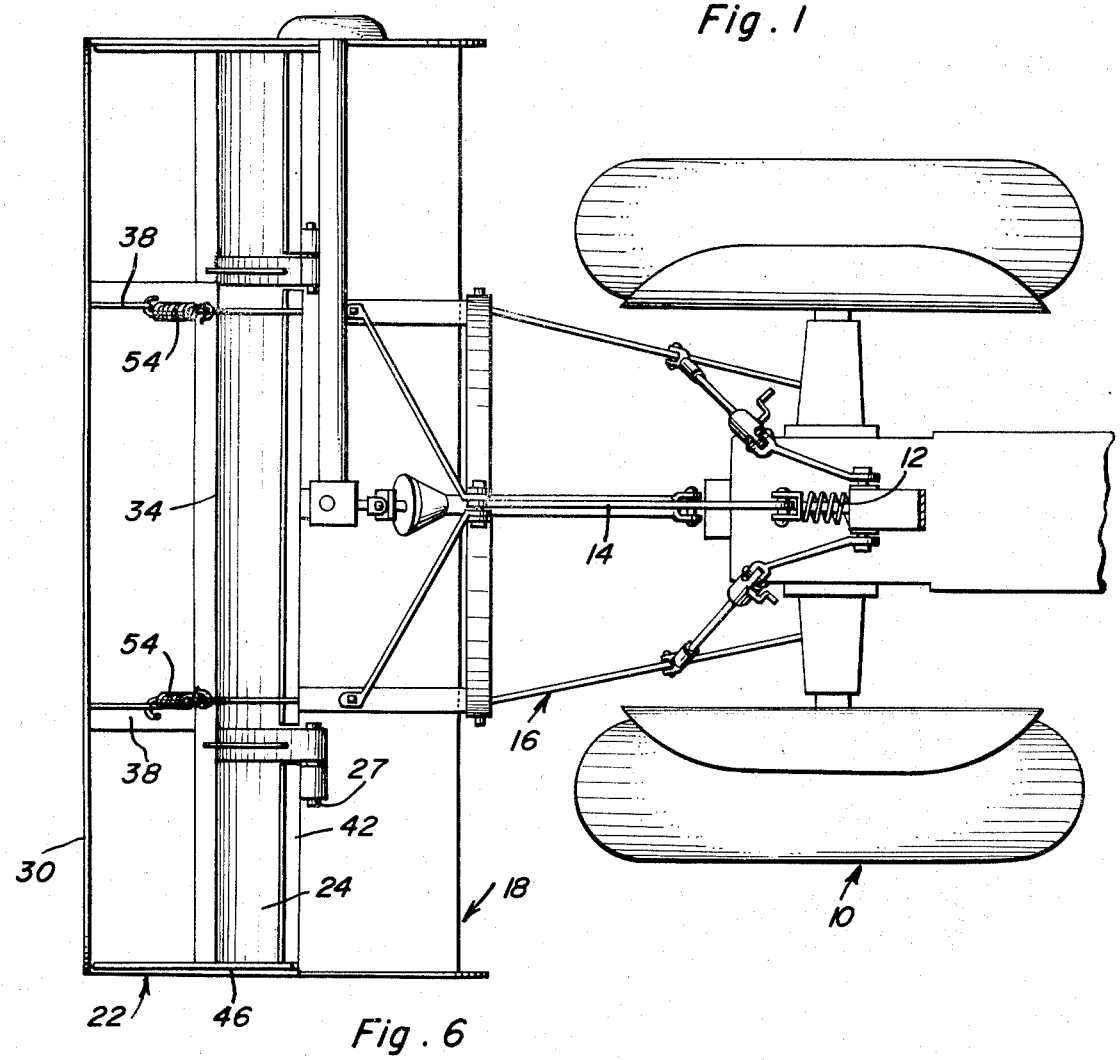
FIG. 1 is a top plan view of a tractor mounted rotary tiller incorporating the depth control skid of the instant invention.
Figure 6:
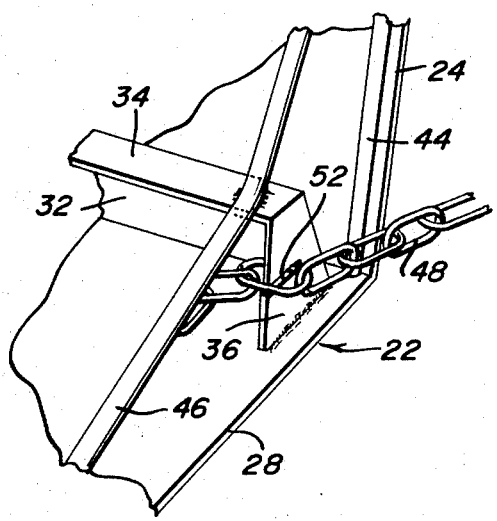
FIG. 6 is a perspective detail of the adjustable end of one of the depth adjusting chains.
Figure 4:
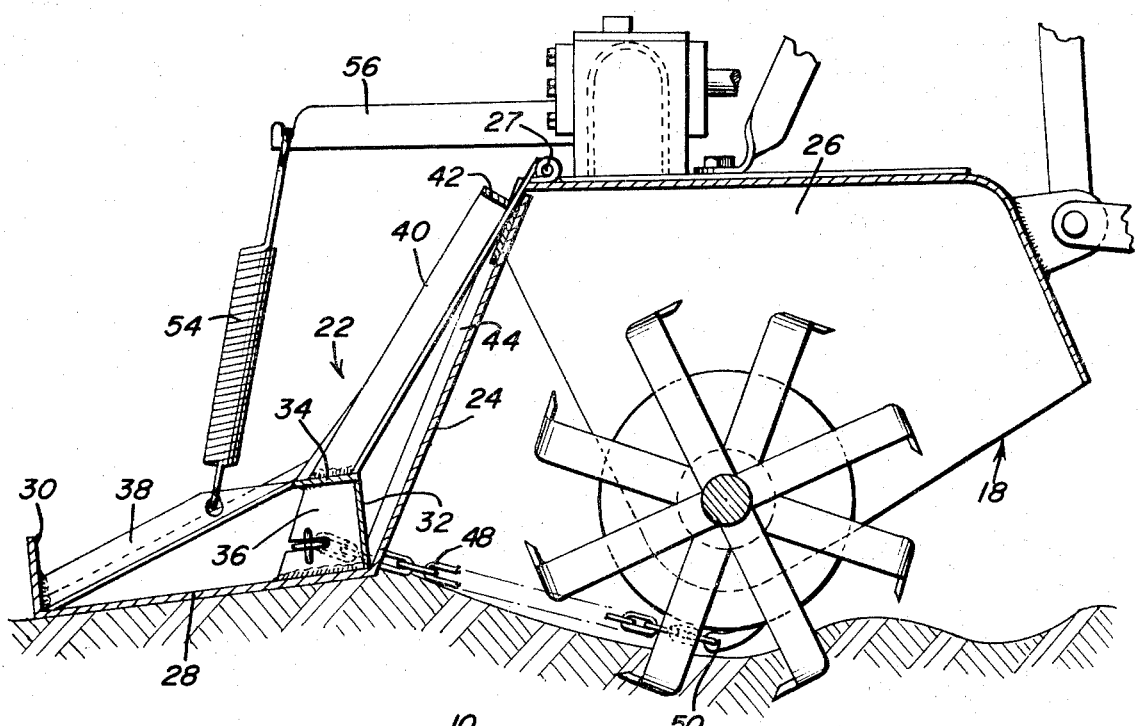
FIG. 4 is an enlarged transverse cross-sectional view through the tiller and skid.
Figure 5:
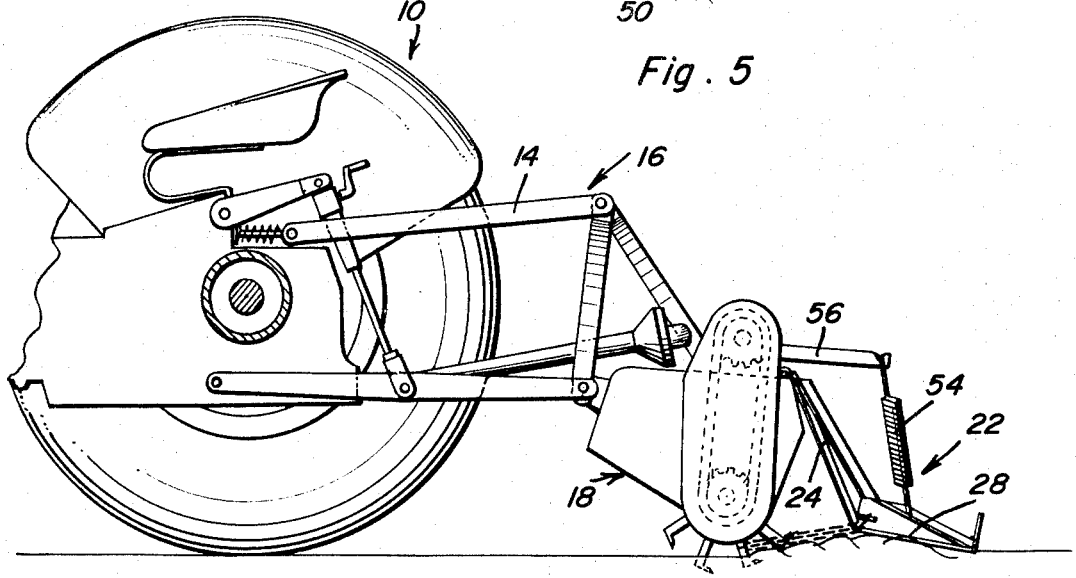
FIG. 5 is a side elevational view from the side opposite FIG. 2, also with the near wheel removed.

Referring now more specifically to the drawings, reference numeral 10 is used to generally designate a tractor incorporating a conventional adjustable draft control, only the double-acting control spring 12 of which has been illustrated. This control is selectively actuated through the top link 14 of the three-point hitch 16 utilized in mounting a land engaging implement, or in the illustrated embodiment, a rotary tiller 18. Both the tiller 18 and the three-point hitch mounting thereof are also conventional, the tiller 18 being pivoted to the cross shaft, as at 20, for a vertical pivotal adjustment thereof. This vertical pivoting of the tiller 18 transmits a force, either tension or compression, to the top link 14 which in turn activates the depth control through a corresponding reaction of the link connected spring 12.

The invention herein is concerned primarily with an addition to the above conventional apparatus in the nature of a skid 22 and the mounting means therefor. The skid 22 includes a tailboard or mounting panel 24 extending along the length of the tiller and pivotally secured to the upper rear edge of the tiller housing 26 as indicated by reference numeral 27. Integral with the lower edge of the mounting panel 24, along the full length thereof, is a rearwardly and downwardly inclined trailing or skid panel 28. The trailing panel or board 28 is rigidified by vertical flanges 30 and 32 projecting upwardly along approximately the full length of the trailing and forward edges thereof. The flange 32 in turn includes an upper rearwardly directed flange 34 and an associated pair of end flanges 36. Additional rigidity is derived from the utilization of bracing bars 38 extending between the upper flange 34 and the lower portion of the trailing flange 30 at spaced points along the skid panel 28. Similar bracing bars 40 are likewise provided between the upper flange 34 and a flange 42 provided along the top edge of the mounting panel 24. Bracing bars 44 are welded to the mounting panel along the opposed edges thereof, and a bracing rod welded to and extended from the mounting panel flange 42 to the top flange 34 and from there to the trailing flange 30 along both edges of the skid. It will thus be appreciated that a highly rigid skid has been provided which can effectively maintain the stresses to be introduced thereinto when functioning both as a means for varying the degree of penetration of the tiller teeth and both leveling and compacting the tilled soil.

The depth of penetration of the tiller teeth is set by the orientation of the skid 22 about the pivotal mounting 27 thereof. In order to fix the relationship between the skid 22 and the tiller 18, while at the same time allowing for a simplified adjustment therebetween, a pair of link chains 48 are utilized. Each of these chains 48 has the forward end thereof secured to the lower end of one of the tiller housing side walls, as at 50. The rearward end portion of each of the chains 48, and more particularly a link thereon, is received through a narrow rearwardly opening notch or slot 52 in the corresponding side flange 36 with the next outermost chain link engaging against the inner side of the flange 36 for an effective although easily released locking of the chain to the flange. Thus, an upward swinging of the skid 22 beyond the desired fixed point is precluded. In order to tension the chains 48, keeping the chains taut while still allowing for an adjustment of the effective length thereof, a pair of elongated coiled tension springs 54 are engaged between a pair of the skid board braces 38 and the forward hook-like ends of a pair of rearwardly directed rigid arms 56 fixed to the top of the tiller housing 26.

In operative position, it will be noted that the skid panel 28 is angled slightly downwardly and rearwardly for a forward drawing thereof over the tilled land in a land-leveling and compacting manner whereby the full lower face of the panel 28 is utilized. The chains 48 are utilized to provide for major adjustments in the operating depth of the tiller 18, minor adjustments being accommodated by the conventionally provided draft controls on the tractor. The skid 22, carrying a part or substantially all of the weight of the tiller and tractor linkage, tends to rotate the tiller about the pivotal mount of the tiller, designated by reference numeral 20, both due to the weight of the tiller and the drag developed by movement along the ground. This in turn causes a forward thrust on the top link 14 and an actuation of the tractor draft control which will have been preset so as to automatically provide for any desired weight-drag combination. The skid, positioned to the rear of the tiller, allows the tiller to grind and iron out small ridges and ground level variations, such as in a plowed field, with the ground subsequently being leveled by the skid itself. The tiller will normally operate in excess of 250 RPM which will grind or till the soil and discharge it to the rear at a rate substantially faster than the forward speed of the tractor which tends to increase the weight on the skid for a more effective leveling action thereby and control of the depth of tilling.

From the foregoing, it will be appreciated that a highly unique skid attachment for a rotary tiller or the like has been devised. This attachment is in the nature of a trailing skid which is adjustable so as to fix the operational depth of the tiller and accommodate ground level variations through the conventionally provided draft control on the tractor without requiring any direct engagement with the tractor other than through the conventionally mounted tiller. This is achieved through an orientation of the skid so as to accommodate part or substantially all of the weight of the tiller with the depth control being adjusted so as to be responsive to a predetermined weight and skid drag combination. Further, by use of the draft control by a qualified operator, the skid can be used for some general levelling. This is effected by increasing the tiller weight to the ground whereby considerable earth may be moved along forward of the skid and released where desired, acting generally like a scraper with a tiller mounted forward thereof to mulch the earth. Likewise, the texture of the tilled soil can be controlled to a considerable degree by increasing the weight of the skid, thus making it more difficult for the tilled earth to exit therebelow. This in turn causes a build up of earth ahead of the skid with the earth falling or feeding back into the tiller teeth and being retilled. It should be appreciated that the entire skid assembly can be pivoted upwardly about the pivot pins or joints 27 by first unlocking the chains. Similarly, by removing the pins 27 the entire assembly can be removed, in both cases allowing for easy and quick access to the tiller rotor for repairs, replacement of teeth, removal of foreign objects. As an example of a tractor incorporating the automatic draft control system contemplated in the above invention, attention is directed to the Massey-Ferguson Model MF 35 diesel tractor.

What is claimed as new is as follows:

1. For use on a tractor mounted land working implement, a depth control trailing skid, said skid including an upper forward mounting means for pivotal engagement with the implement to the rear thereof, and a trailing ground engaging portion engageable with the ground rearward of the implement, said skid being vertically pivotable relative to said implement to vary the vertical distance between the ground engaging portion of the skid and the lower working portion of the implement, means for fixing said skid in a pivotally adjusted position, comprising at least one fixed length flexible member having a first end thereof fixed to the lower portion of the implement, and a second end portion thereof engageable, selectively at points along the second end portion, with the skid below the point of pivotal engagement with the implement, and spring means engaged between the upper portion of the implement and the skid so as to upwardly bias the skid and tension the flexible member, the skid mounting means including a flat panel of a length approximately equal to that of the implement, said panel having an upper edge constituting the point of pivotal engagement with the implement, and a lower edge from which the trailing ground engaging portion rearwardly projects, said ground engaging portion including a trailing panel of equal length with the mounting panel, said trailing panel projecting rearwardly and downwardly from the mounting panel for engagement with the ground at a forward acute angle whereby substantially the entire lower face of the trailing panel is in working contact with the surface of the ground.

2. Land working equipment including a tractor and a tractor mounted land working implement, said implement being mounted on the tractor by means of a three-point hitch incorporating an upper hitch link engaged with a tractor mounted hydraulic hitch height controlling system, a pair of lower hitch links, said implement being pivotally engaged to said lower links, said height controlling system being actuated in response to a longitudinal movement of said upper link, movement of said upper link being effected through a vertical pivoting of the implement about the lower links, and a depth control skid mounted on the rear of said implement and depending into load supporting engagement with the ground to sense variations therein and effect a pivotal movement of said implement in response to such variations and a corresponding system activating movement of the implement connected upper hitch link, said skid being pivotally adjusted to vary the height thereof relative to the implement and hence vary the depth at which the implement operates, and means for fixing the skid relative to the implement in any of a plurality of pivotally adjusted positions in a manner so as to transmit vertical ground level responsive movement of the skid directly to the implement for a corresponding movement thereof and a resultant movement of the height controlling system actuating link, said skid including an upper forward mounting portion for pivotal engagement with the implement to the rear thereof, and a trailing ground engaging portion engageable with the ground rearward of the implement, said means for fixing the skid relative to the implement in any of a plurality of pivotally adjusted positions comprising at least one fixed link flexible member having a first end thereof fixed to the lower portion of the implement and a second end portion thereof engageable with the skid below the point of pivotal engagement with the implement, and spring means engaged between the upper portion of the implement and the skid so as to upwardly bias the skid and tension the flexible member, the skid mounting means including a flat panel of a length approximately equal to that of the implement, said panel having an upper edge constituting the point of pivotal engagement with the implement, and a lower edge from which the trailing ground engaging portion rearwardly projects, said ground engaging portion including a trailing panel of equal length with the mounting panel, said trailing panel projecting rearwardly and downwardly from the mounting panel for engagement with the ground at a forward acute angle whereby substantially the entire lower face of the trailing panel is in working contact with the surface of the ground.

* * * * *